(12) United States Patent
Rodgers et al.

(10) Patent No.: US 8,285,988 B2
(45) Date of Patent: Oct. 9, 2012

(54) METHOD AND SYSTEM FOR COMMAND AUTHENTICATION TO ACHIEVE A SECURE INTERFACE

(75) Inventors: Stephanie Rodgers, San Diego, CA (US); Xuemin Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1601 days.

(21) Appl. No.: 11/558,662

(22) Filed: Nov. 10, 2006

(65) Prior Publication Data

US 2008/0046733 A1 Feb. 21, 2008

Related U.S. Application Data

(60) Provisional application No. 60/798,943, filed on May 9, 2006.

(51) Int. Cl.
*H04L 9/32* (2006.01)
(52) U.S. Cl. ............................ 713/168; 713/171; 380/44
(58) Field of Classification Search .......... 713/168–181; 380/44–47, 277–286
See application file for complete search history.

(56) References Cited

U.S. PATENT DOCUMENTS

| 5,003,593 | A | | 3/1991 | Mihm, Jr. |
| 5,022,076 | A | | 6/1991 | Rosenow et al. |
| 5,293,576 | A | * | 3/1994 | Mihm et al. .................. 713/170 |
| 5,896,499 | A | | 4/1999 | McKelvey |
| 5,913,053 | A | | 6/1999 | Nonogaki et al. |
| 6,158,004 | A | | 12/2000 | Mason et al. |
| 6,363,444 | B1 | | 3/2002 | Platko et al. |
| 6,385,317 | B1 | * | 5/2002 | Rix et al. ...................... 380/258 |
| 6,795,905 | B1 | | 9/2004 | Ellison et al. |
| 6,895,504 | B1 | * | 5/2005 | Zhang et al. .................. 713/175 |
| 6,959,089 | B1 | * | 10/2005 | Sprunk ......................... 380/239 |
| 7,152,166 | B2 | | 12/2006 | Strom et al. |

(Continued)

FOREIGN PATENT DOCUMENTS

CN 1215528 4/1999

(Continued)

OTHER PUBLICATIONS

Menezes, A et al; Handbook of Applied Crytography, Key Management Techniques; Handbook of Applied Cryptography; 1996; pp. 543-590; XP002246921.

(Continued)

*Primary Examiner* — Jason K. Gee
*Assistant Examiner* — Amare F Tabor
(74) *Attorney, Agent, or Firm* — Sterne, Kessler, Goldstein & Fox PLLC

(57) ABSTRACT

Aspects of a method and system for command authentication to achieve a secure interface are provided. Command authentication between a host and a slave device in a multimedia system may be achieved by on-the-fly pairing or by an automatic one-time-programming via a security processor. In an on-the-fly pairing scheme, the host may generate a host key based on a host root key and host control words while the slave may generate slave key based the host key, a slave root key and slave control words. The slave key may be stored and later retrieved by the slave device to obtain the host key for authenticating host commands. The host may be disabled from generating and/or passing the host key to the slave. In an automatic one-time-programming scheme, the security processor may burn a random number onto a one-time-programmable memory in the host and slave devices for command authentication.

28 Claims, 6 Drawing Sheets

U.S. PATENT DOCUMENTS

| | | | |
|---|---|---|---|
| 7,228,439 B2* | 6/2007 | Sasselli | 713/193 |
| 7,305,534 B2 | 12/2007 | Watt et al. | |
| 7,328,342 B2* | 2/2008 | Albanese et al. | 713/170 |
| 7,370,201 B2 | 5/2008 | Arnoux | |
| 7,389,376 B2 | 6/2008 | Nakai | |
| 7,487,367 B2 | 2/2009 | Belnet et al. | |
| 7,634,585 B2 | 12/2009 | Conley et al. | |
| 7,636,840 B2* | 12/2009 | Tang | 713/150 |
| 7,831,827 B2* | 11/2010 | Walmsley | 713/168 |
| 8,032,761 B2 | 10/2011 | Rodgers et al. | |
| 8,156,345 B2 | 4/2012 | Rodgers et al. | |
| 2001/0052070 A1 | 12/2001 | Oishi et al. | |
| 2004/0039924 A1 | 2/2004 | Baldwin et al. | |
| 2004/0078584 A1* | 4/2004 | Moroney et al. | 713/189 |
| 2004/0083364 A1* | 4/2004 | Andreaux et al. | 713/165 |
| 2004/0177261 A1 | 9/2004 | Watt et al. | |
| 2005/0063541 A1 | 3/2005 | Candelore | |
| 2006/0033840 A1* | 2/2006 | Diehl et al. | 348/468 |
| 2006/0034457 A1 | 2/2006 | Damgaard et al. | |
| 2006/0059369 A1 | 3/2006 | Fayad et al. | |
| 2006/0129806 A1 | 6/2006 | Walmsley | |
| 2006/0136717 A1* | 6/2006 | Buer et al. | 713/155 |
| 2006/0136725 A1* | 6/2006 | Walmsley | 713/171 |
| 2006/0161704 A1 | 7/2006 | Nystad et al. | |
| 2006/0174136 A1 | 8/2006 | Lyons et al. | |
| 2007/0041403 A1 | 2/2007 | Day et al. | |
| 2007/0056042 A1 | 3/2007 | Qawami et al. | |
| 2007/0106907 A1 | 5/2007 | Rainsard et al. | |
| 2007/0143601 A1 | 6/2007 | Arroyo et al. | |
| 2007/0174614 A1 | 7/2007 | Duane et al. | |
| 2007/0266232 A1 | 11/2007 | Rodgers et al. | |
| 2008/0104348 A1 | 5/2008 | Kabzinski et al. | |
| 2008/0109656 A1* | 5/2008 | Kotzin | 713/165 |
| 2009/0092060 A1* | 4/2009 | Goto | 370/254 |
| 2010/0005301 A1* | 1/2010 | Asano et al. | 713/171 |

FOREIGN PATENT DOCUMENTS

| | | |
|---|---|---|
| CN | 1647532 | 7/2005 |
| CN | 1694397 | 11/2005 |
| EP | 1562318 B1 | 8/2005 |
| WO | 97/38530 B1 | 10/1997 |

OTHER PUBLICATIONS

Office Action mailed Mar. 4, 2010 in U.S. Appl. No. 11/558,650, Rodgers et al., filed Nov. 10, 2006, 17 pages.

Office Action mailed Aug. 16, 2010 in U.S. Appl. No. 11/558,650, Rodgers et al., filed Nov. 10, 2006, 9 pages.

Office Action mailed Jan. 6, 2011 in U.S. Appl. No. 11/558,650, Rodgers et al., filed Nov. 10, 2006, 9 pages.

Office Action mailed Jan. 5, 2010 in U.S. Appl. No. 11/558,650, Rodgers et al., filed Nov. 10, 2006, 12 pages.

Office Action mailed Aug. 12, 2010 in U.S. Appl. No. 11/558,650, Rodgers et al., filed Nov. 10, 2006, 8 pages.

Office Action mailed Jan. 24, 2011 in U.S. Appl. No. 11/558,630, Rodgers et al., filed Nov. 10, 2006, 9 pages.

Notice of Allowance mailed May 31, 2011 in U.S. Appl. No. 11/558,630, Rodgers et al., filed Nov. 10, 2006, 7 pages.

Notice of Allowance mailed Dec. 8, 2011 in U.S. Appl. No. 13/252,484, Rodgers et al., filed Oct. 4, 2011, 5 pages.

\* cited by examiner

METHOD AND SYSTEM FOR COMMAND AUTHENTICATION TO ACHIEVE A SECURE INTERFACE

CROSS-REFERENCE TO RELATED APPLICATIONS/INCORPORATION BY REFERENCE

This patent application makes reference to, claims priority to and claims benefit from U.S. Provisional Patent Application Ser. No. 60/798,943, which was filed on May 9, 2006.

This application also makes reference to:
U.S. application Ser. No. 11/558,650 filed on even date herewith; and
U.S. application Ser. No. 11/558,630 filed on even date herewith.

Each of the above stated applications is hereby incorporated by reference in its entirety.

FIELD OF THE INVENTION

Certain embodiments of the invention relate to securing information in multimedia systems. More specifically, certain embodiments of the invention relate to a method and system for command authentication to achieve a secure interface.

BACKGROUND OF THE INVENTION

In a multimedia system, such as a set-top box (STB), for example where multiple chips on a board communicate with each other, the security of the interfaces between these chips have to be considered in determining the overall security provided by the system. In particular, when one chip is a master device and another chip is a slave device, and when the communication between the master and slave devices occurs over an easily tapped or hijacked medium such as the PCI bus, for example, steps may need to be taken to ensure that the slave device may not be controlled by an unauthorized device. This may be especially important when, for example, the master or host device may be responsible for providing network conditional access (CA) decryption on video/audio data received by the multimedia system, and then re-encrypting the original data using a local copy-protection (CP) method before communicating the re-encrypted data to the slave device. In this instance, an unauthorized user may recover the video/audio data when the data communication between the host and slave devices is compromised. In this regard, an unauthorized user may attack the slave device instead of the higher security host device to recover the original video/audio data with the CA encryption removed.

In master-slave device configurations on a multimedia system board, for example, often the slave device has limited processing capabilities and may not be capable of providing a full software layer. In these instances, the host device may be utilized to configure the slave device via a plurality of commands sent over a generic interface, such as the PCI bus, for example. This may result in an additional level of exposure to unauthorized users since the slave device may not be capable of distinguishing when commands are being sent from the authorized host device or from an unauthorized host device. Without being able to make this distinction, the slave device may be configured by another device on the PCI bus, for example, regardless of the device's authorization status.

Authentication generally refers to the method by which the slave device may ensure that a command being sent to it comes from a legitimate or authorized host device. A slave device may be enabled to accept command from a single authorized device. A generally utilized approach for allowing the slave device to authenticate the host device is to use some sort of public key/private key protocol, where host commands may be signed using its private key, and which are then authenticated by the slave device using the public key. However, without a common shared secret, this type of authentication may be subject to a "man in the middle" attack, for example. In such an attack, a device on the common bus may write a public key to the slave device, where the public key may corresponds to the unauthorized device's own private key, and thus enable the unauthorized device to issue commands that may be considered "authenticated" by the slave device. Another problem with this approach is that the public/private key pair is common for all devices. Therefore, if the private key is ever compromised, it will compromise the devices that utilize this scheme.

Another level of security may include a common secret that may be utilized to provide authentication between devices. In this approach, the host device may encrypt commands that may somehow incorporate the common secret and the slave device may compare this value to its internally stored common secret to ensure that the command originates from an authorized source. However, while a common secret may be useful for helping to keep the details of key exchange secure, exposure of the common secret will compromise the devices.

Another approach may involve the use of a unique per device pair, sometimes known as "pairing", in order to ensure that for any given slave device there may a single master device. In many STB integrated circuits (ICs), an internal non-volatile memory, such as a one-time-programmable (OTP) or on-chip secure flash, for example, may be utilized to store secure root keys which may be unique for every chip. Utilizing this approach, both the host and slave devices may be programmed with the same secure root key. As a result, commands sent by the host device may be encrypted by, for example, some derivative of the secure root key. Since only a single master device has this key, the slave device may be assured that the command came from the single legitimate source.

However, "pairing" may have logistical and/or practical limitations. In most integrated circuit fabrication and assembly facilities, it may be very difficult to keep track of pairs of chips or devices throughout the manufacturing, validation, testing, and/or board mounting stages. Moreover, different types of chips, as the host and slave devices generally are, may be manufactured separately, and a large amount of time and expense may be used to keep track of pairs of devices from two separate fabrication processes and/or sources in order to enable a "pairing" scheme.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for command authentication to achieve a secure interface, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for command authentication to achieve a secure interface. Aspects of the invention may comprise command authentication between a host and a slave device in a multimedia system that may be achieved by on-the-fly pairing or by an automatic one-time-programming via a security processor. In an on-the-fly pairing scheme, the host may generate a host key based on a host root key and host control words while the slave may generate slave key based the host key, a slave root key and slave control words. The slave key may be stored and later retrieved by the slave device to obtain the host key for authenticating host commands. The host may be disabled from generating and/or passing the host key to the slave. In an automatic one-time-programming scheme, the security processor may burn a random number onto a one-time-programmable (OTP) memory in the host and slave devices for command authentication.

In an embodiment of the invention, a master device and a slave device may be integrated circuits that may be mounted onto a single circuit board utilized in a set-top-box (STB) operation and/or in other similar applications, for example. The master or host device may be utilized to remove network conditional access (CA) decryption from the incoming data and to re-encrypt the data utilizing a different algorithm such as a local copy-protection (CP) method, for example. The decrypted/re-encrypted data may be communicated to the slave device via a PCI memory transfer and/or a dedicated serial interface, for example. In some instances, a mailbox command protocol may be utilized between the host and the slave devices over a PCI bus, for example, to send command and/or to configure at least a portion of the slave device. In this regard, the communication of data between the master or host device and the slave device may require that the mailbox communication scheme provide a secure exchange, for example, commands on this interface may require encryption and may utilize at least a first level of protection against replay attacks. When processing commands, the slave device may be able to authenticate the source of the commands to ensure that it is a legitimate device. Master keys may be utilized to create final session keys for commands and/or CP data encryption/decryption, for example. In this regard, a secure method of passing the master keys between the host and slave devices may be implemented. Moreover, to protect from rogue devices tapping into or snooping on the common bus, unauthorized devices may not be able to access the slave device's internal registers and/or access the slave device's private memory, such as DRAM memory, for example, to read clear intermediate data.

Figure 1:
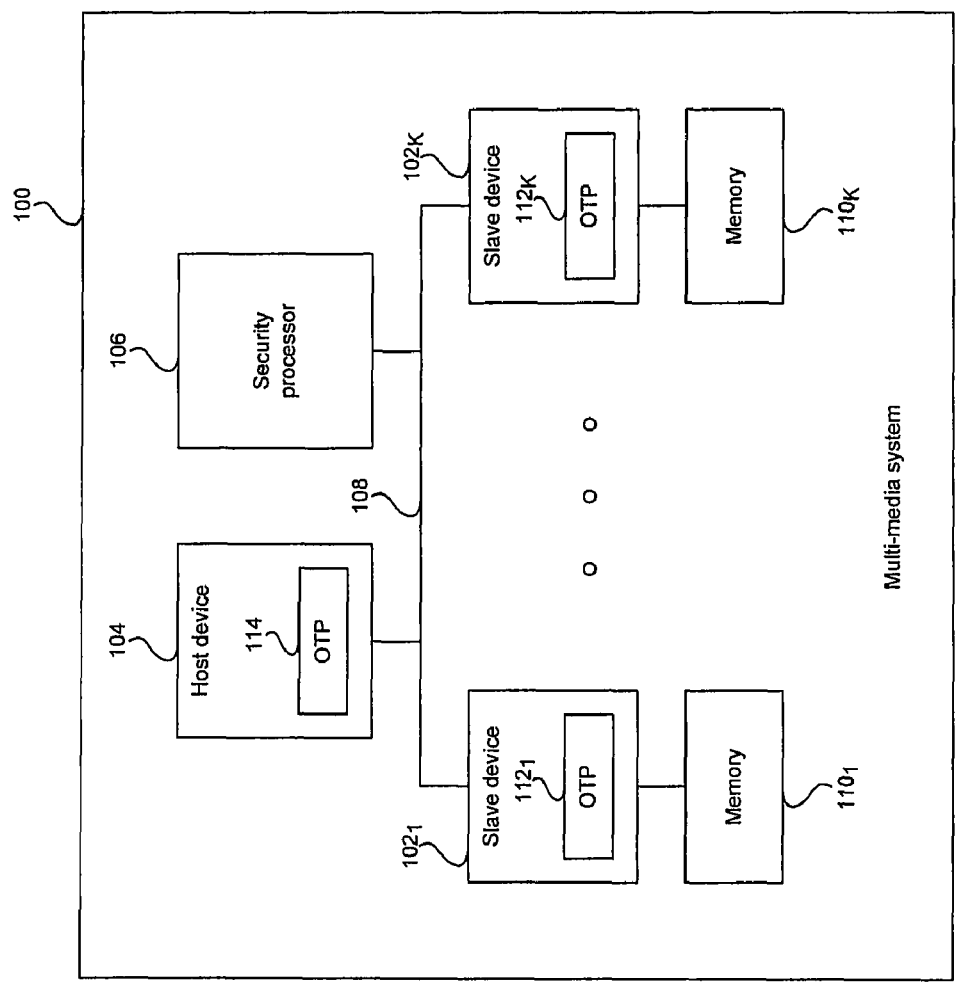
FIG. 1 is a block diagram illustrating an exemplary multimedia system, in accordance with an embodiment of the invention.

FIG. 1 is a block diagram illustrating an exemplary multimedia system, in accordance with an embodiment of the invention. Referring to FIG. 1, there is shown a multimedia system 100 that may comprise at least one slave device 102, a memory 110 associated with a slave device 102, a host device 104, a security processor 106, and a bus interface 108. The multimedia system 100 may be utilized in a set-top-box and/or other similar applications, for example. The bus interface 108 may be a PCI bus interface, for example. The slave device 102 may comprise a one-time-programmable memory 112. The host device 104 may comprise a one-time-programmable memory 114. In an exemplary embodiment of the multimedia system 100 shown in FIG. 1, the multimedia system 100 may comprise a plurality of slave devices $102_1, \ldots, 102_K$ that may be utilized with associated memories $110_1, \ldots, 110_K$, and corresponding one-time-programmable memories $112_1, \ldots, 112_K$. The host device 104, the slave devices $102_1, \ldots 102_N$, the security processor 106, and/or the memories $110_1, \ldots, 110_K$ may be implemented as at least one integrated circuit (IC), for example.

The host device 104 may comprise suitable logic, circuitry, and/or code that may enable control and/or management of operations in the multimedia system 100. For example, the host device 104 may be utilized to generate and send commands to at least a portion of the components in the multimedia system 100 via a bus interface, such as the bus interface 108. In this regard, the host device 104 may also enable secure communication with at least a portion of the components in the multimedia system 100, such as the slave devices $102_1, \ldots, 102_K$, by utilizing command authentication schemes over the common bus interface. The host device 104 may support either or both an on-the-fly pairing command authentication operation and an automatic OTP key programming command authentication operation. The host 104 may also support other secure operations such as key exchange, prevention of replay attacks, and/or prevention of memory attacks, for example. The host OTP memory 114 within the host device 104 may comprise suitable logic, circuitry, and/or code that may enable storage of information that may be utilized for supporting command authentication operations.

The slave devices $102_1, \ldots, 102_K$ may each comprise suitable logic, circuitry, and/or code that may enable processing of audio and/or video data in the multimedia system 100. The slave devices $102_1, \ldots, 102_K$ may receive commands for processing audio and/or video data and may require some guarantee that the commands received originate from an authorized source. For example, when receiving commands from, for example, the host device 104, the slave devices $102_1, \ldots, 102_K$ may support authentication of the received commands based on either or both an on-the-fly pairing command authentication operation and an automatic OTP key programming command authentication operation. The slave OTP memories $112_1, \ldots, 112_K$ within a slave devices $102_1, \ldots, 102_K$ may comprise suitable logic, circuitry, and/or code that may enable storage of information that may be utilized for supporting command authentication operations.

The memories $110_1, \ldots, 110_K$ may comprise suitable logic, circuitry, and/or code that may enable storage of data associated with the operations performed by the slave devices $102_1, \ldots, 102_K$. For example, for command authentication operations, the memories $110_1, \ldots, 110_K$ may be utilized for storage of data, such as encoding and/or decoding keys, for example, that may be necessary to authenticate that commands received by the slave devices $102_1, \ldots, 102_K$ were sent from an authorized source, such as the host device 104. In some instances, the memories $110_1, \ldots, 110_K$ may be portions of a single or multiple memory devices, such as a FLASH memory, for example.

The security processor 106 may comprise suitable logic, circuitry, and/or code that may enable providing security operations to the multimedia system 100. For example, the security processor 106 may support command authentication operations to protect the data processed and the operations performed by the slave devices $102_1, \ldots 102_K$ from being accessed by unauthorized sources. In this regard, the security processor 106 may support either or both an on-the-fly pairing command authentication operation and an automatic OTP key programming command authentication operation in the slave devices $102_1, \ldots, 102_K$. The security processor 106 may also support security operations that control data and/or command access to at least a portion of the components in the multimedia system 100.

Figure 2:
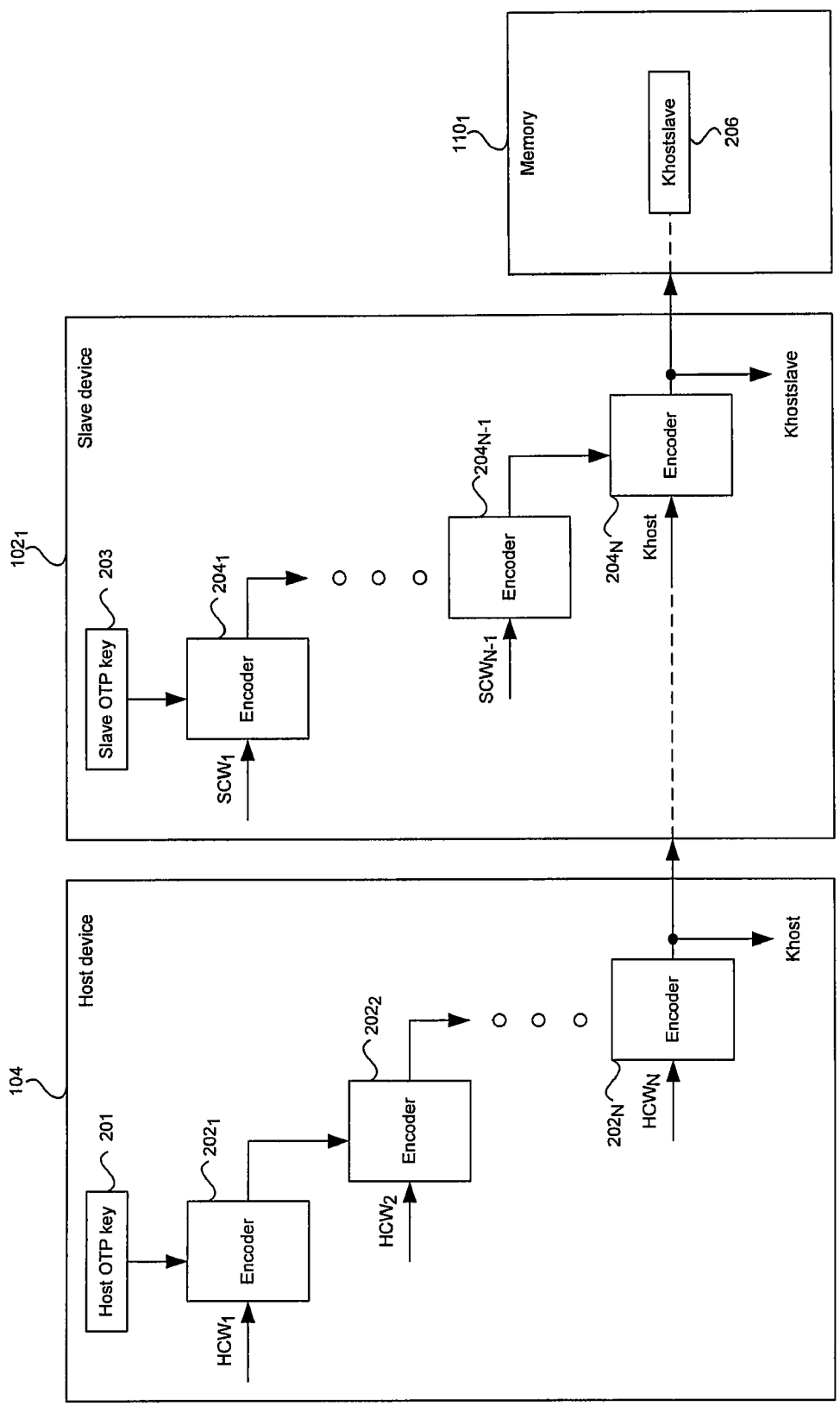
FIG. 2 is a block diagram illustrating exemplary multimedia system components for generating a common secure key utilizing on-the-fly pairing command authentication, in accordance with an embodiment of the invention.

FIG. 2 is a block diagram illustrating exemplary multimedia system components for generating a common secure key utilizing on-the-fly pairing command authentication, in accordance with an embodiment of the invention. Referring to FIG. 2, there is shown the host device 104, a slave device $102_1$ and its associated memory $110_1$. The host device 104 may comprise a host OTP root key (OTPhost) 201 that may be stored within, for example, the host OTP memory 114 as disclosed in FIG. 1. The host device 104 may also utilize a plurality of host control words $HCW_1, \ldots, HCW_N$, and a plurality of encoders $202_1, \ldots, 202_N$. The plurality of encoders $202_1, \ldots, 202_N$ may comprise suitable logic, circuitry, and/or code that may enable encryption operations for implementing a key ladder, such as a cipher operated in a recursive manner, for example, that may be utilized for multiple encryption of user-specific host control words with derivatives of the host OTP root key 201 to generate a final derivative value or host key, Khost. The host device 104 may receive at least one signal, which may facilitate generation of the host key, Khost, based on the host OTP root key 201 stored within the host device 104, for example. The host device 104 may also receive at least one signal to pass the host key, Khost, to the slave device $102_1$, for example.

The slave device $102_1$ may comprise a slave OTP root key (OTPslave) 203 that may be stored within, for example, the slave OTP memory $112_1$ as disclosed in FIG. 1. The slave device $102_1$ may also utilize a plurality of slave control words $SCW_1, \ldots, SCW_{N-1}$, and a plurality of encoders $204_1, \ldots, 204_N$. The plurality of encoders $204_1, \ldots, 204_N$ may comprise suitable logic, circuitry, and/or code that may enable a key ladder, such as a cipher operated in a recursive manner, for example, that may be utilized for multiple encryption of user-specific slave control words and the host key, Khost, with derivatives of the slave OTP root key 203 to generate a final derivative value or slave key, Khostslave. The slave device $102_a$ may receive at least one signal, which may facilitate generation of the slave key, Khostslave, based on the slave OTP root key 203 stored within the slave device $102_1$ and the passed host key, Khost. The slave device $102_1$ may also receive at least one signal, which may facilitate passing of the slave key, Khostslave, to the memory $110_1$ for storage, for example. The memory $110_1$ may comprise a portion 206 for storage of the slave key, Khostslave, generated by the slave device $102_1$. Notwithstanding the exemplary embodiment disclosed in FIG. 2, on-the-fly pairing may be implemented between the host device 104 and more than one of the slave devices $102_1, \ldots, 102_K$.

The key ladder utilized by the host device 104 and/or the slave device 102, may allow the OTP root key to encrypt user specified data, such as the control words, which is in turn used as the key for the next stage encryption operation. In this regard, key ladders may have more than one encryption level in order to allow a final key to have a proper crypto-distance from the OTP root key. Moreover, the key ladder may allow the final stage to go to a readable register/memory, so that software may access the final derivative key.

Figure 3:
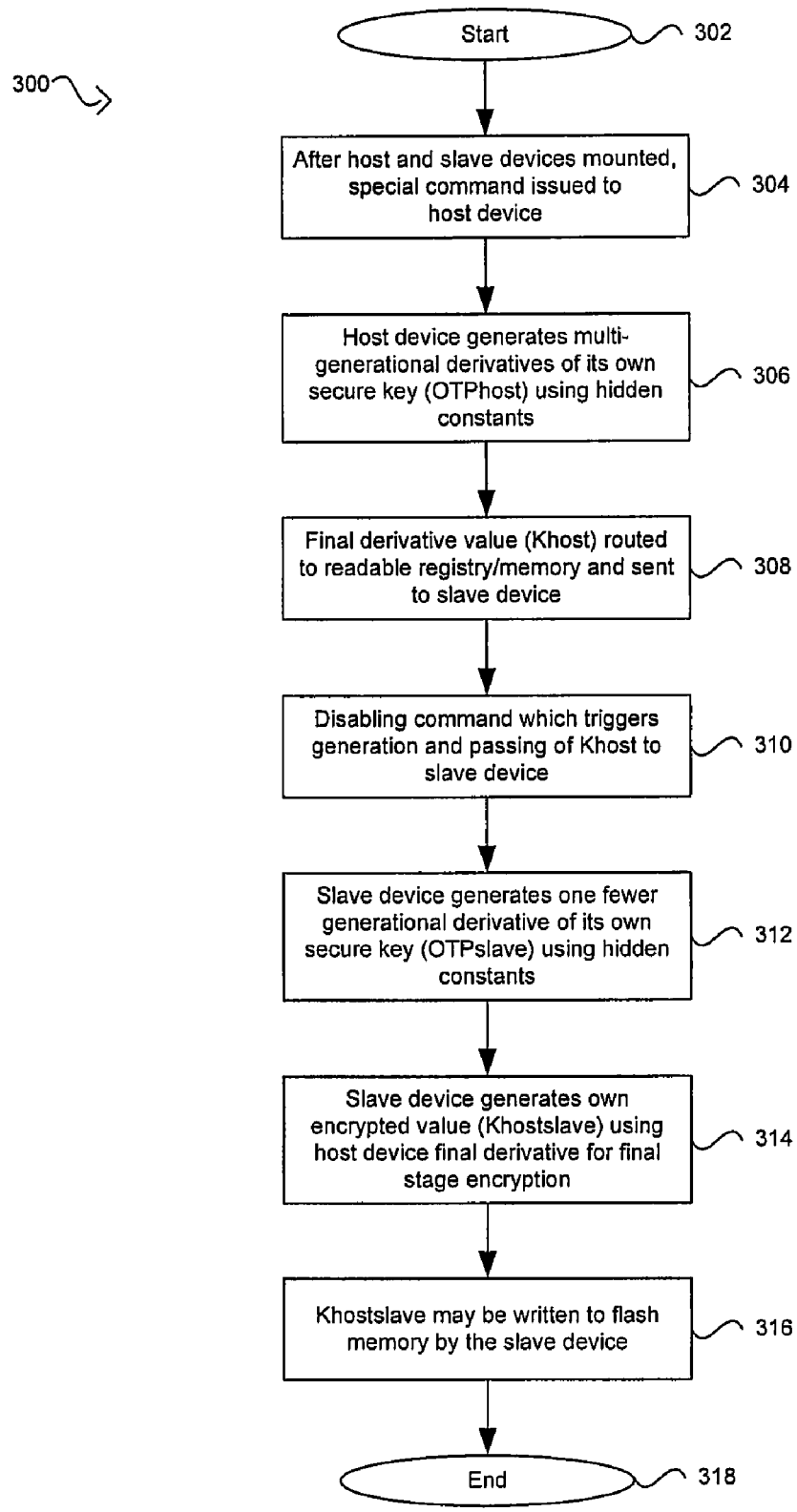
FIG. 3 is a flow diagram illustrating exemplary steps for generating a common secure key utilizing on-the-fly pairing command authentication, in accordance with an embodiment of the invention.

FIG. 3 is a flow diagram illustrating exemplary steps for generating a common secure key utilizing on-the-fly pairing command authentication, in accordance with an embodiment of the invention. Referring to FIG. 3, there is shown a flow diagram 300. In step 304, after start step 302, during manufacturing, assembling, and/or testing of at least a portion of a multimedia system 100, when the integrated circuits corresponding to the host device 104 and the slave devices $102_1, \ldots, 102_K$ have been mounted on a circuit board, a special command or signal may be communicated to the host device 104, which may facilitate generation and/or passing of the host key, Khost, to at least one of the slave devices $102_1, \ldots, 102_K$. In step 306, the special command or signal enables the host device 104 to generate multi-generational derivatives of the host OTP root key 201, OTPhost, using host control words that may be stored in the host device 104. For example, N derivatives of the OTPhost may be generated by utilizing the host control words $HCW_1, \ldots, HCW_N$. The final derivative value or host key, Khost, may be generated based on the following expression:

$$K_{host}=F(OTP_{host}, HCW_1, HCW_2, \ldots, HCW_N),$$

where the function F( ) corresponds to the recursive cipher key ladder implemented utilizing the encoders $202_1, \ldots, 202_N$.

In step 308, the final derivative value or host key, Khost, may be routed to a readable register/memory within the host device 104 and may be sent to at least one of the slave devices $102_1, \ldots, 102_K$. In step 310, at least one command or signal may be generated to disable the host device 104 from subsequent generations and/or passings of the host key, Khost, to the slave devices $102_1, \ldots, 102_K$. In step 312, at least one command or signal may be generated to indicate to at least one of the slave devices $102_1, \ldots, 102_K$ to generate corresponding slave keys, Khostslave, based on the slave OTP root key 203, OTPslave, stored within a slave OTP memory. In this regard, N−1 derivatives of the OTPslave may be generated by utilizing the slave control words $SCW_1, \ldots, SCW_{N-1}$. The slave control words may be different than the host control words. In step 314, the slave device may generate a final derivative value or slave key, Khostslave, based on the host key, Khost, during a final stage of encryption. The final derivative value or slave key, Khostslave, may be generated based on the following expression:

$$K_{hostslave}=F(OTP_{slave}, SCW_1, SCW_2, \ldots, SCW_{N-1}, K_{host}),$$

where the function F( ) corresponds to the recursive cipher key ladder implemented utilizing the encoders $204_1, \ldots, 204_N$. In step 316, the slave key, Khostslave, may be written to a corresponding memory, such as the memories $110_1, \ldots, 110_K$ that may be FLASH memories, for example. After step 316 the process may proceed to end step 318, for example.

The passing of host key, Khost, to the slave device may not be sufficiently secure, since it may expose the root value. However, by disabling the host device 104 as disclosed in step 310, the passing of the host key, Khost, may be performed once during manufacturing, assembling, and/or testing. In this regard, a command or signal may disable the generation and/or passing of the host key, Khost, by disabling or setting at least one OTP bit in the host OTP memory 114. The value of slave key, Khostslave, in memory may not be altered by an attacker or unauthorized user because commands to the slave devices $102_1, \ldots, 102_K$ may not be authenticated.

Figure 4:
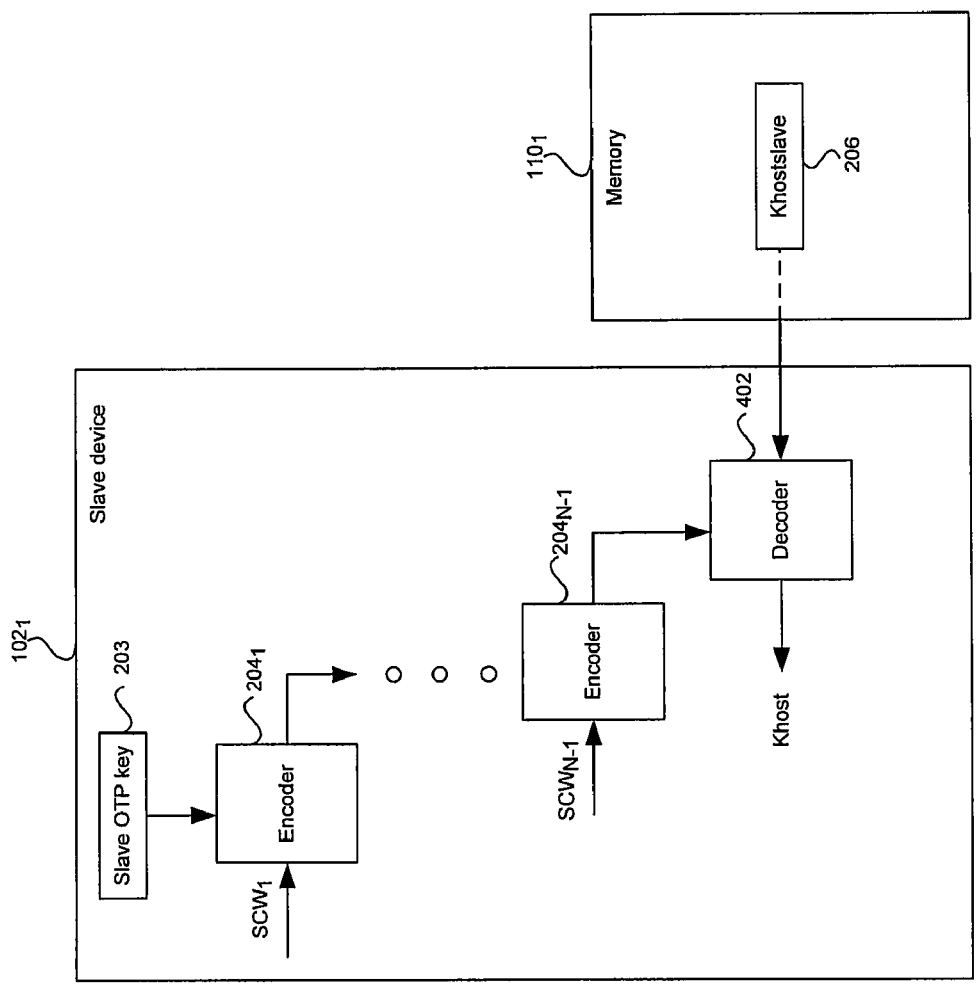
FIG. 4 is a block diagram illustrating exemplary multimedia system components for decoding a common secure key to enable on-the-fly pairing command authentication, in accordance with an embodiment of the invention.

FIG. 4 is a block diagram illustrating exemplary multimedia system components for decoding a common secure key to enable on-the-fly pairing command authentication, in accordance with an embodiment of the invention. Referring to FIG. 4, there is shown the slave device $102_1$ and the memory $110_1$ as disclosed in FIG. 2. The slave device $102_1$ may comprise the slave OTP root key (OTPslave) 203 that may be stored within, for example, the slave OTP memory $112_1$ as disclosed in FIG. 1, and a plurality of encoders $204_1, \ldots, 204_{N-1}$. The slave device $102_1$ may also comprise a decoder 402 that may comprise suitable logic, circuitry, and/or code that may enable a key ladder, such as a cipher operated in a recursive manner, for example, that may be utilized for decrypting or decoding the host key, Khost, with derivatives of the slave OTP root key 203 based on the slave key, Khostslave, stored in the portion 206 of the memory $110_1$. The decoded host key, Khost, may be utilized to decrypt and authenticate host commands that are received by the slave device $102_1$. Notwithstanding the exemplary embodiment disclosed in FIG. 4, decoding of a common secure key for on-the-fly pairing authentication operations may be performed by more than one of the slave devices $102_1, \ldots, 102_K$.

Figure 5:
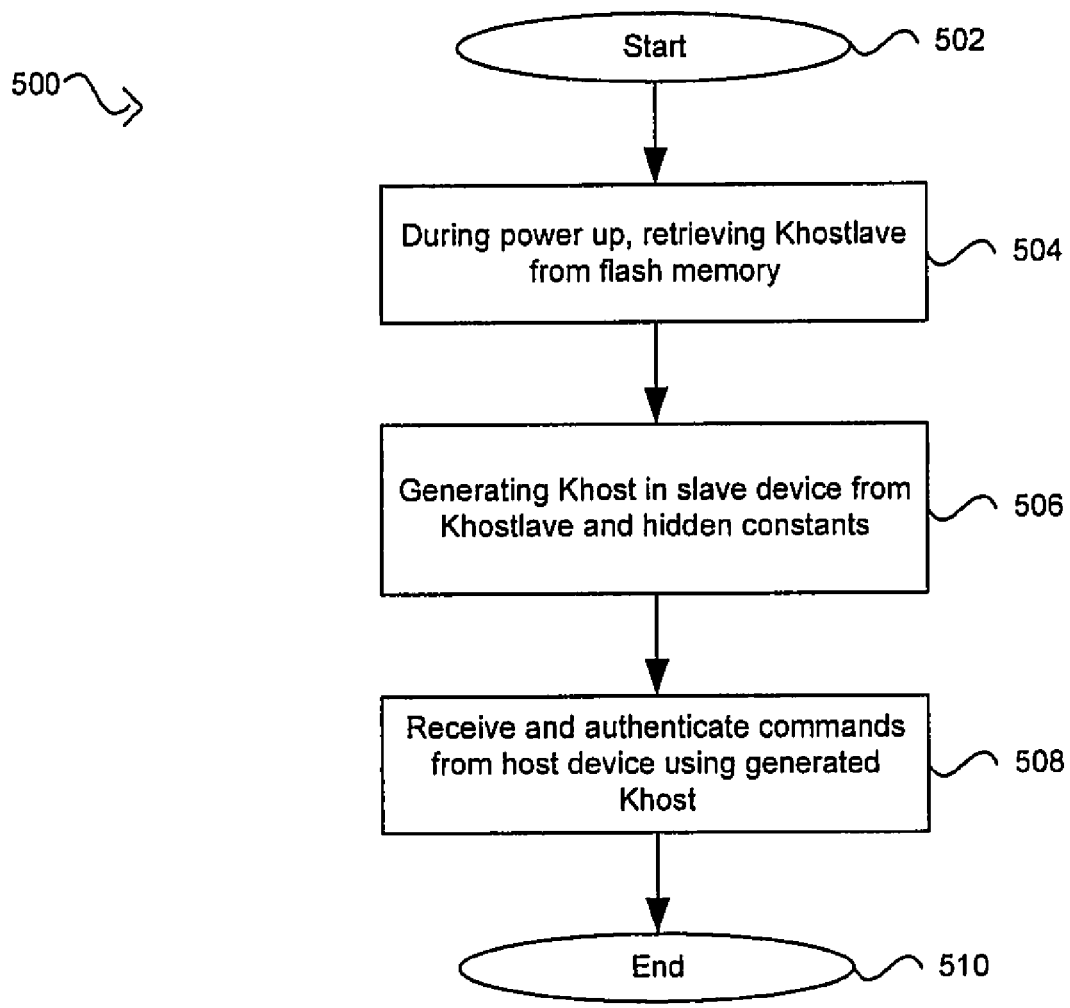
FIG. 5 is a flow diagram illustrating exemplary steps for decoding a common secure key utilizing on-the-fly pairing command authentication, in accordance with an embodiment of the invention.

FIG. 5 is a flow diagram illustrating exemplary steps for decoding a common secure key utilizing on-the-fly pairing command authentication, in accordance with an embodiment of the invention. Referring to FIG. 5, there is shown a flow diagram 500. In step 504, after start step 502, when the multimedia system 100 is powered up, a slave device, such as the slave device $102_1$, for example, may read the slave key, Khostslave, from the corresponding memory, which may be a FLASH memory, for example. In step 506, the slave device may then utilize hidden constants, such as the slave control words $SCW_1, SCW_2, \ldots, SCW_{N-1}$, for example, to obtain the host key, Khost, by performing a decryption operation on the slave key, Khostslave, during the final stage of the recursive cipher key ladder. In step 508, commands received from the host device, such as the host device 104, may be authenticated since the host key, Khost, may be known to both the host and slave devices and the host key, Khost, has not been exposed since the passing to the slave device during manufacturing, assembling, and/or testing of at least a portion of a multimedia system 100 as disclosed in FIGS. 3-4.

Figure 6:
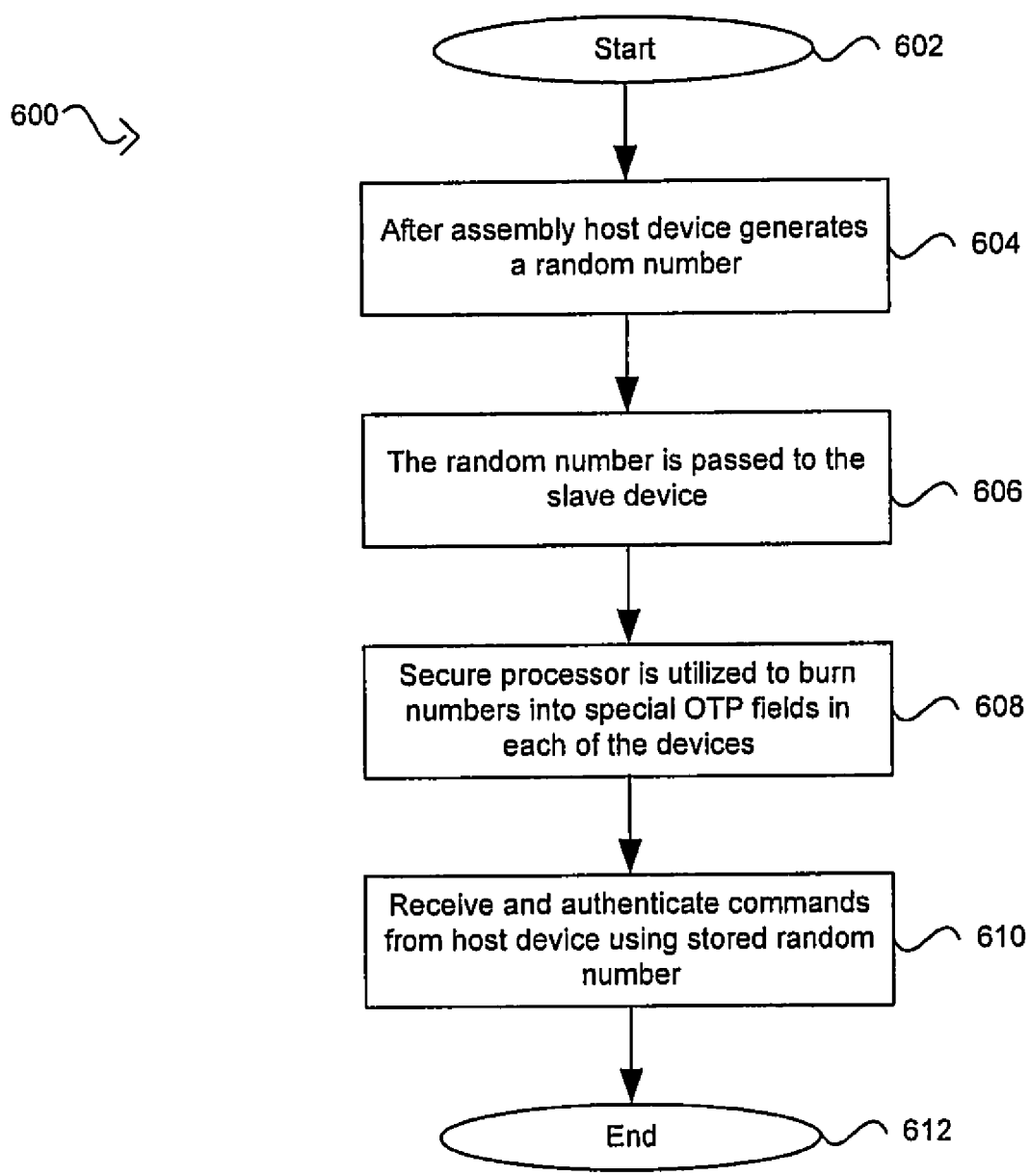
FIG. 6 is a flow diagram illustrating exemplary steps for generating a common secure key utilizing automatic one-time-programmable key programming by utilizing a security processor, in accordance with an embodiment of the invention.

FIG. 6 is a flow diagram illustrating exemplary steps for generating a common secure key utilizing automatic OTP key programming by utilizing a security processor, in accordance with an embodiment of the invention. Referring to FIG. 6, there is shown a flow diagram 600 that may be correspond to a pairing scheme that may not require tracking parts in the field by utilizing automatic burning of symmetric OTP keys by a security processor. In step 604, after start step 602, the host device 104 in the multimedia system 100 disclosed in FIG. 1 may be utilized to generate a random number during manufacturing, assembling, and/or testing of at least a portion of a multimedia system 100. In this regard, at least one command or signal may be generated, which may function as an indication to the host device 104 to generate the random number.

In step 606, the generated random number may be passed to at least one slave device, such as the slave devices $102_1, \ldots, 102_K$ in the multimedia system 100, that may be communicatively coupled to the host device 104 via, for example, the bus interface 108 disclosed in FIG. 1. In this regard, at least one command or signal may be generated to indicate to the host device 104 to pass or communicate the random number to a slave device. In step 608, a security processor, such as the security processor 106 disclosed in FIG. 1, that may be communicatively coupled to the host device 104 and at least one slave device via the bus interface 108, may be utilized to burn or program the generated random number into specified OTP fields within the OTP memories in each of the devices. In this regard, the random numbers may be utilized as a common secure key or utilized to generate a common secure key for command authentication operations.

In step 610, the host device 104 may encrypt commands to be communicated to the devices $102_1, \ldots, 102_K$ using at least one derivative of the generated random number. In this regard, the automatic OTP key programming approach for command authentication may be secure since no key exchange may be necessary to obtain the root key since both keys have already been programmed into the devices. Moreover, lower level keys may also generated based on this approach.

Notwithstanding the embodiment of the invention disclosed in FIG. 6, the automatic OTP key programming approach may also be applied for asymmetric OTP keys when the security processor is enabled of generating asymmetric key pairs, for example.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for secure communication in a device, the method comprising:
   in a slave device:
      receiving from a host device, a host device key that is generated by said host device based on a host root key and at least one control word stored within said host device, wherein said host device is configured to generate said host device key only once;
      generating by said slave device, a slave device key based on said received host device key, a slave root key, and at least one control word stored within said slave device; and
      authenticating by said slave device, commands received from said host device utilizing said generated slave device key.

2. The method according to claim 1, comprising storing said generated slave device key in a memory communicatively coupled to said slave device.

3. The method according to claim 2, comprising retrieving said stored generated slave device key from said memory after power up.

4. The method according to claim 3, comprising authenticating commands from said host device in said slave device by decoding said host device key from said retrieved generated slave device key.

5. The method according to claim 1, wherein said host device is prevented from generating another host device key after said host device key is generated by said host device.

6. The method according to claim 1, wherein said host device key is generated by said host based on at least one derivative of said host root key.

7. The method according to claim 1, comprising generating said slave device key based on at least one derivative of said slave root key.

8. A non-transitory machine-readable storage having stored thereon, a computer program having at least one code section for secure communication in a device, the at least one code section being executable by a machine for causing the machine to perform steps comprising:
   in a slave device:
      receiving from a host device, a host device key that is generated by said host device based on a host root key and at least one control word stored within said host device, wherein said host device is configured to generate said host device key only once;
      generating by said slave device, a slave device key based on said received host device key, a slave root key, and at least one control word stored within said slave device; and
      authenticating by said slave device, commands received from said host device utilizing said generated slave device key.

9. The non-transitory machine-readable storage according to claim 8, wherein said at least one code section comprises code for storing said generated slave device key in a memory communicatively coupled to said slave device.

10. The non-transitory machine-readable storage according to claim 9, wherein said at least one code section comprises code for retrieving said stored generated slave device key from said memory after power up.

11. The non-transitory machine-readable storage according to claim 10, wherein said at least one code section comprises code for authenticating commands from said host device in said slave device by decoding said host device key from said retrieved generated slave device key.

12. The non-transitory machine-readable storage according to claim 8, wherein said host device is prevented from generating said another host device key after said host device key is generated by said host.

13. The non-transitory machine-readable storage according to claim 8, wherein said host device key is generated based on at least one derivative of said host root key.

14. The non-transitory machine-readable storage according to claim 8, wherein said at least one code section comprises code for generating said slave device key based on at least one derivative of said slave root key.

15. A system for secure communication in a device, the system comprising:
   a slave device that is communicatively coupled to a host device, said slave device enables generation of a slave device key based on a host device key received from said host device, a slave root key, and at least one control word stored within said slave device, wherein:
      said host device generates said host device key based on a host root key and at least one control word stored within said host device; and
      said host device is configured to generate said host device key only once; and
   said slave device enables authentication of commands received from said host device utilizing said generated slave device key.

16. The system according to claim 15, wherein said slave device enables storage of said generated slave device key in a memory communicatively coupled to said slave device.

17. The system according to claim 16, wherein said slave device enables retrieval of said stored generated slave device key from said memory after power up.

18. The system according to claim 17, wherein said slave device enables authentication of commands from said host device by decoding said host device key from said retrieved generated slave device key.

19. The system according to claim 15, wherein said host device is prevented from generating another host device key after said host device generates said host device key.

20. The system according to claim 15, wherein said host device generates said host device key based on at least one derivative of said host root key.

21. The system according to claim 15, wherein said slave device enables generation of said slave device key based on at least one derivative of said slave root key.

22. A system for secure communication in a device, the system comprising:
- a slave device for communicatively coupling to a host device, said slave device enabling generation of a slave device key based on a host device key received from said host device, a slave root key, and at least one control word stored within said slave device, said host device key generated by the host device based on a host root key and at least one control word stored within said host device and wherein said host device key is generated by the host device only once; and
- said slave device enables authentication of commands received from said host device utilizing said generated slave device key.

23. The system according to claim 22, wherein said slave device enables storage of said generated slave device key in a memory communicatively coupled to said slave device.

24. The system according to claim 23, wherein said slave device enables retrieval of said stored generated slave device key from said memory after power up.

25. The system according to claim 24, wherein said slave device enables authentication of commands from said host device by decoding said host device key from said retrieved generated slave device key.

26. The system according to claim 22, comprising disabling generation of said host device key.

27. The system according to claim 22, wherein said host device key is generated by said host device based on at least one derivative of said host root key.

28. The system according to claim 22, wherein said slave device enables generation of said slave device key based on at least one derivative of said slave root key.

* * * * *

UNITED STATES PATENT AND TRADEMARK OFFICE
CERTIFICATE OF CORRECTION

PATENT NO.       : 8,285,988 B2                                    Page 1 of 1
APPLICATION NO.  : 11/558662
DATED            : October 9, 2012
INVENTOR(S)      : Rodgers et al.

It is certified that error appears in the above-identified patent and that said Letters Patent is hereby corrected as shown below:

In the Claims:

Column 10
Line 21, claim 12, please replace "said another host" with --another host--.

Signed and Sealed this
Twenty-second Day of October, 2013

Teresa Stanek Rea
*Deputy Director of the United States Patent and Trademark Office*